United States Patent [19]

Miseli

[11] Patent Number: 5,537,145
[45] Date of Patent: Jul. 16, 1996

[54] EVALUATION METHOD AND SYSTEM FOR PERFORMANCE OF FLAT PANEL DISPLAYS AND INTERFACE HARDWARE

[75] Inventor: Joseph V. Miseli, San Bruno, Calif.

[73] Assignee: Sun Microsystems, Inc., Mountain View, Calif.

[21] Appl. No.: 349,882

[22] Filed: Dec. 6, 1994

[51] Int. Cl.$^6$ ............................................. H04N 17/00
[52] U.S. Cl. .................................... 348/181; 345/904
[58] Field of Search ........................... 371/20.4, 24, 27, 371/72; 348/177, 178, 180, 181, 182, 184, 185, 189, 190, 191; 358/504; 455/67.4; 364/551.01; 345/904

[56] References Cited

U.S. PATENT DOCUMENTS

| | | | |
|---|---|---|---|
| 4,635,096 | 1/1987 | Morgan | 348/181 |
| 5,175,772 | 12/1992 | Kahn et al. | 345/904 X |
| 5,351,201 | 9/1994 | Harshbarger, Jr. et al. | 364/551.01 |
| 5,369,432 | 11/1994 | Kennedy | 348/181 |

*Primary Examiner*—Victor R. Kostak
*Assistant Examiner*—Nathan J. Flynn
*Attorney, Agent, or Firm*—Blakely Sokoloff Taylor & Zafman

[57] ABSTRACT

A system and method for testing and evaluating a display device and its associated display drive circuitry through computer generated graphic test patterns which are dynamically alterable. The system comprises a display device for displaying the test patterns, a computer for generating the test patterns which typically are dynamically alterable and a communication line for coupling the computer and the display device together so that the computer can transmit information forming the test patterns to the display device. The test patterns are monitored visually to detect video artifacts. Alternatively, monitoring may be performed by measuring devices such as signal analyzing devices or optical testing devices.

The method for evaluating and detecting video artifacts of a display device and its associated display drive circuitry is performed through at least three steps. First, a test program is executed by the processor to produce a plurality of video signals collectively forming a specific test pattern which are transferred into the display device through the display drive circuitry. Second, an input device is re-mapped to that it can provide information for dynamically altering the specific test pattern. Finally, evaluation of the display device and the display drive circuitry is performed based on visual evaluation, optical evaluation by an optical testing device or signal evaluation by an signal testing device.

20 Claims, 8 Drawing Sheets

EVALUATION METHOD AND SYSTEM FOR PERFORMANCE OF FLAT PANEL DISPLAYS AND INTERFACE HARDWARE

BACKGROUND OF THE INVENTION

1. Field of the Invention

The present invention relates to a testing system for a display device. More specifically, the present invention relates to a system and method for testing and evaluating a display device and its associated display drive circuitry through computer generated graphic test patterns which are dynamically alterable.

2. Background Art Related to the Invention

Over the last decade, a variety of conventional systems have been developed to generate graphic test patterns, namely particularly chosen computer-generated objects (e.g., vertical or horizontal bars, stationary squares, etc.) onto a two-dimensional, phosphor coated, raster scanned display screen such as a cathode ray tube ("CRT") display. Since the CRT is a "temporal" display usually experiencing time-related video artifacts defined as abnormal video performance (e.g., geometric distortions, illuminance variations and pixel instability), these conventional systems generate a variety of static (i.e. spatially fixed), graphic test patterns and then transmit these test patterns to the CRT. Although these conventional systems may be effective for detecting certain video artifacts, they are not effective for testing flat panel displays e.g., liquid crystal displays (LCDs) such as thin film transistor LCDs ("TFT LCDs") and Super Twist Nomadic LCDs ("STN LCDs").

A primary reason for such ineffectiveness is that the conventional testing process utilizes static test patterns which are incapable of being dynamically altered by a test operator based on his or her subjective observations or objective observations by testing equipment. For example, it is being discovered that although flat panel display devices may appear to be devoid of any video artifacts based on conventional non-alterable test patterns, slight changes to these test patterns uncover many video artifacts that never would have been detected by conventional test systems.

Another disadvantage evident in testing of flat panel displays is that these displays are configured to support a predetermined pixel geometry (pixel size, number of pixels, size of scan lines, etc.) and a particular manner driving the pixels. Since configurations of flat panel displays vary considerably between different manufacturers and different product lines from one manufacturer, the testing of these flat panel displays using test patterns of conventional pattern generation systems is highly unreliable.

Yet another disadvantage associated with using static test patterns for flat panel displays is that only a limited number of graphic test patterns are available to the test operator. As a result, the test operator typically is unable to localize the test pattern about a certain location of the display to further study a potential error. To do so, he or she would be required to write a new software program which is time-consuming and cost inefficient because the location may vary for different displays as discussed above.

An additional disadvantage associated with the conventional testing process is that even if a defect is detected and correct, there exists a possibility that a worst case event still exists in which the defect may reoccur if certain conditions arise. Unfortunately, the conventional system does not provide an availability of slightly altering the test patterns for detecting the worst case event.

Another disadvantage is that it is difficult to analyze display driving circuitry since video signals are complicated wave forms which are difficult to synchronize by testing equipment such as an oscilloscope.

Hence, it would be desirable to develop a system and method for testing displays and its drive circuitry, especially flat panel displays, which allow the test operator to dynamically alter video test patterns so that further measurements can be performed based on subjective or objective observations. The present invention, in fact, provides for such testing as described in the following sections.

BRIEF SUMMARY OF THE INVENTION

In light of the foregoing, it will be apparent that there exists a need for a system and method for reliably testing and evaluating screen displays, especially flat panel screen displays, through video test patterns which are capable of being dynamically altered by a test operator based on subjective observations by the test operator or results from optical or signal analytical test devices.

The present invention relates to a system for generating dynamically alterable test patterns for display on a display device. The system includes the display device for displaying the test patterns, a computer for generating the data signals forming the test patterns which typically are dynamically alterable and a communication line for coupling the computer and the display device together so that the computer can transmit these data signals to the display device. A second alternative is for monitoring the signals generated from the computer through signal analyzing devices such as oscilloscopes, spectrum analyzers or logic analyzers, optionally removing the display device. A third alternative allows self-analysis of optical testing devices in determining electro-optical display performance.

The method for testing the display comprises the following steps. A first step is for the test operator to enter a command to run a program for generating a number of test patterns for the display device. It is contemplated that a number of switches may be entered at run-time with the command to enable optional operations to occur or to alter default values (e.g., the pixel length of the display screen). Next, a host processor of the computer system reads a configuration file stored in system memory to obtain geometric information about the display device.

After initialization, the computer system enters into a "Global" mode. In this mode, the host processor generates a list of icons for each of the test patterns. Then, the test operator selects the type of testing process; namely, an automatic or manual testing process. The automatic testing process generates a number of test patterns useful, for example, for quick viewing in a production environment when multiple displays are observed. The patterns produced in this manner can be predetermined to show sensitivities of video artifacts common for the particular display type. The manual testing process enables the test operator to individually select a specific test pattern for more detailed observation and analysis of the display such as, for example, in an engineering environment when careful analysis of a single device is performed. Once the test pattern is manually selected, the alpha-numeric keyboard is re-mapped for local processing of each pattern and the computer system enters into a "Local" mode. In the Local mode, several general characteristics (e.g., size, positioning, etc.) of the test pattern can be dynamically altered through depression of a specific predetermined key of the alpha-numeric keyboard.

If a video artifact is detected or the test pattern appears to be suspect, there are two courses of action that may be taken by the test operator, although these courses are not mutually exclusive. A first course is to further alter the test pattern parameters to define the boundary conditions of the video artifact to ascertain ranges of the boundary conditions. A second course of action is to store the state of the pattern globally in the configuration file or locally by writing to an external file or storing the state of the pattern into storage elements so that the identical pattern can later be recalled for use in ascertaining the state of other displays having the same configuration.

BRIEF DESCRIPTION OF THE DRAWINGS

The features and advantages of the present invention will become apparent from the following detailed description of the present invention in which.

DETAILED DESCRIPTION OF THE PRESENT INVENTION

The detailed description which follows is presented largely in terms of a system and method for testing a display device of a computer system, preferably a flat panel display, by generating and displaying video test patterns which are dynamically alterable. The method is generally conceived as a sequence of steps leading to a determination as to whether there exist any video artifacts associated with physical characteristics of the display as well as the drive circuitry of the display. These steps may require the generation and transmission of electrical, electro-magnetic, infrared or other type of communication signals, which are capable of being stored, transferred, compared, combined or otherwise manipulated within the computer system. Furthermore, these steps represent the most effective manner of conveying the essence of the present invention to others skilled in the art.

Furthermore, in the following detailed description, a (video) test pattern is defined as a computer-generated object or a collection of computer-generated objects for display on a display device (e.g., CRT or flat panel display). Moreover, a specific test pattern has been described for the sole purpose of illustrating how the system overcomes the above-enumerated disadvantages associated with the conventional testing process to distinguish the present invention therefrom. Thus, this example should not be construed in any way as a limitation on the scope of the present invention.

Figure 1:
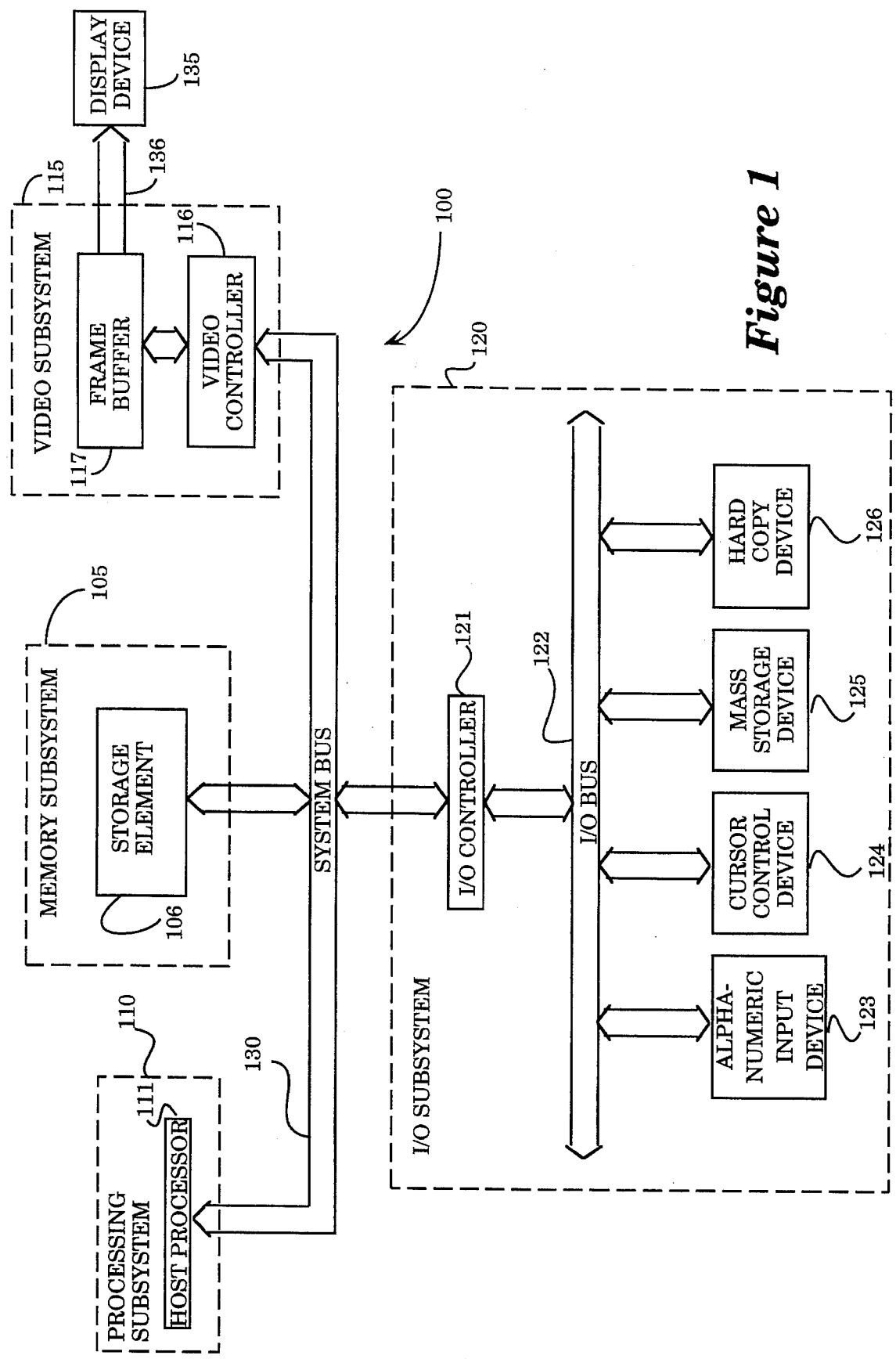
FIG. 1 is a block diagram of a computer system used for visual evaluation of a display device undergoing a testing procedure outlined by the present invention.

Referring to FIG. 1, an embodiment of a computer system 100 utilizing the present invention is illustrated. The computer system 100 generally comprises a memory subsystem 105, processing subsystem 110, video subsystem 115 and an I/O subsystem 120, all of which are coupled together through a system bus 130. These subsystems are those typically employed in most general purpose computers and workstations, including those manufactured by Sun Microsystems, Inc. of Mountain View, Calif. For example, a Voyager™ system running Solaris™ 5.3, UNIX® 4.1.X or any directory-oriented operating system.

The memory subsystem 105, providing temporary and permanent storage of information, includes a storage element 106 which may be any type of memory such as, for example, a dynamic random access memory ("DRAM"), read only memory ("ROM"), static random access memory ("SRAM"), video random access memory ("VRAM") and the like. The storage element 106 is designated to store a test program executable by the processing subsystem 110 and other information as needed. The processing subsystem 110 includes a host processor 111 although it is contemplated that multiple host processors could be employed therein. The host processor 111 performs a variety of operations including execution of the test program stored in the storage element 106 in order to generate a number of data signals collectively forming a video test pattern. It is contemplated, however, that the host processor 111 may execute a test program directly from a mass data storage unit 125 of the I/O subsystem 120 in lieu of the storage element 106.

The video subsystem 115 includes a video controller 116 coupled to the system bus 130 to receive as input these data signals generated from the host processor 111 and converts them into a particular format utilized by a frame buffer 117. The video controller 116 then inputs these converted data signals into the frame buffer 117. The frame buffer 117 transforms the converted data signals into corresponding video signals having coherent timing relationships to drive a display device 135 coupled through a unidirectional data display bus 136. When analyzing signal characteristics by signal testing devices such as oscilloscopes, spectrum analyzers, logic analyzers and the like, it is important for the video signals to contain data producing coherent timing due to inherent difficulties in analyzing these video signals when improperly synchronized or containing arbitrary video pixel data. Thus, more precise measurements may be made than attempting to analyze the video patterns having arbitrary data.

The I/O subsystem 120 comprises an I/O controller 121 operating as an interface between the system bus 130 and an I/O bus 122. The I/O controller 122 provides a communication path within the computer system 100 so that at least one of a plurality of peripheral devices coupled to the I/O bus 122 may transfer information to and receive information from the memory subsystem 105, the processor subsystem 110 and the video subsystem 115. The plurality of peripheral devices includes, but is not limited to, an alphanumeric input device 123 (e.g., an alphanumeric keyboard, etc.) for transmitting information and commands to the host processor 111; a cursor control device 124 (e.g., a mouse, track ball, touch pad, etc.) for indicating to the host processor 111 to alter placement of the test pattern; the mass data storage device 125 (e.g., magnetic tapes, hard disk drive, floppy disk drive, etc.) for storing information and instructions; and a hard copy device 126 (e.g., plotter, printer, facsimile machine etc.) for providing a tangible, visual representation of the information. It is contemplated that the computer system shown in FIG. 1 may employ some or all of these components or different components than those illustrated.

Figure 2A:
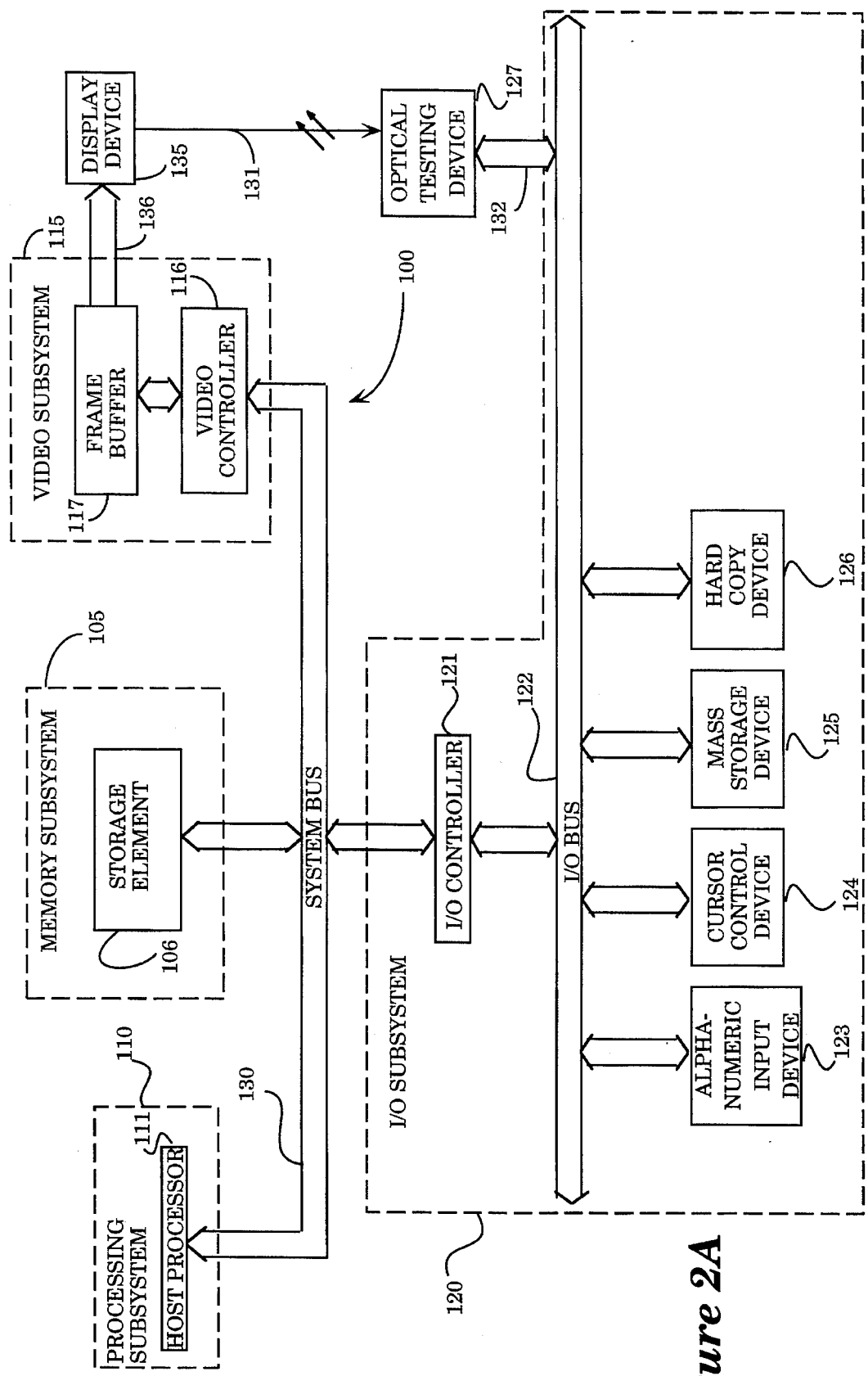
FIG. 2A is a block diagram of the computer system employing an optical testing device for evaluation of video test patterns.
Figure 2B:
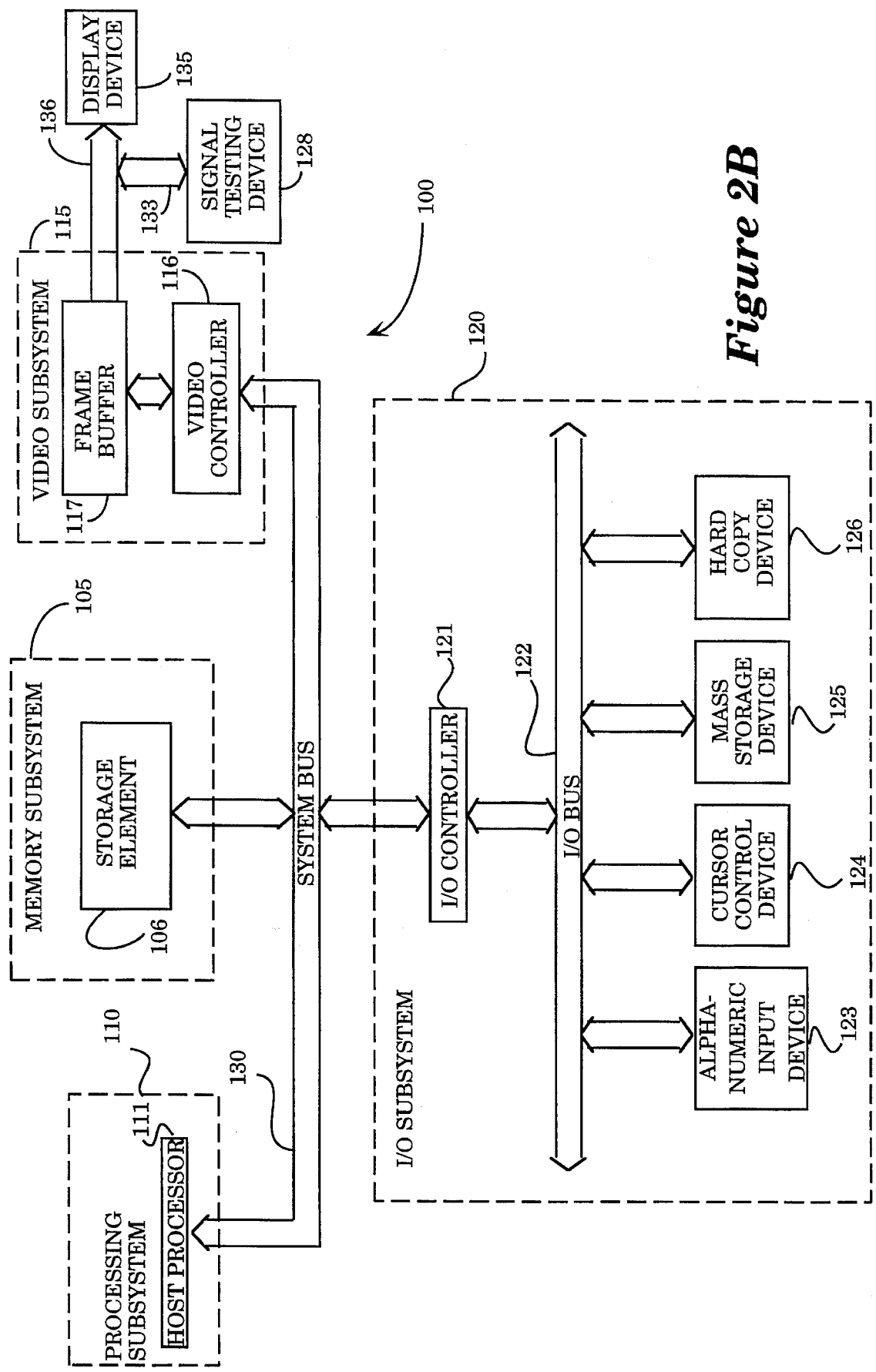
FIG. 2B is a block diagram of the computer system employing a signal testing device for evaluation of video wave forms generated by the computer system to display particular video patterns.

Testing and evaluation of the display devices may be accomplished through visual evaluation, optical evaluation or signal evaluation. Visual evaluation by the test operator requires the computer system 100 as disclosed in FIG. 1, however for signal and optical evaluation, additional external measuring devices separate from the computer system would be employed as shown in FIGS. 2A and 2B. For example, for optical evaluation, an external optical testing device 127 (e.g., colorimeter, photodetector, spectraradiometer) may be directed toward a display screen of the display device 135 for measuring area or pixel illuminance, chromaticity, shadowing and other light-related characteristics of the display device 135 as represented by a directional arrow 131 with light radiation arrows. The optical testing device 127 transfers such measurements via a first communication link 132 to the I/O bus 122. These measurements may be further read by the host processor 111 as desired.

For signal evaluation as shown in FIG. 2B, an external signal testing device (e.g., oscilloscope, spectrum analyzer, logic analyzer or meter) 128 may be coupled to the unidirectional display bus 136 via a bus line 133 to receive those video signals input into the display device 135 in order to evaluate the characteristics of these video signals. However, it is contemplated that for signal evaluation, the display device 135 alternatively may be decoupled from the computer system 100 so that the video signals generated by the frame buffer 117 are solely input into the signal testing device 128.

Figure 3:
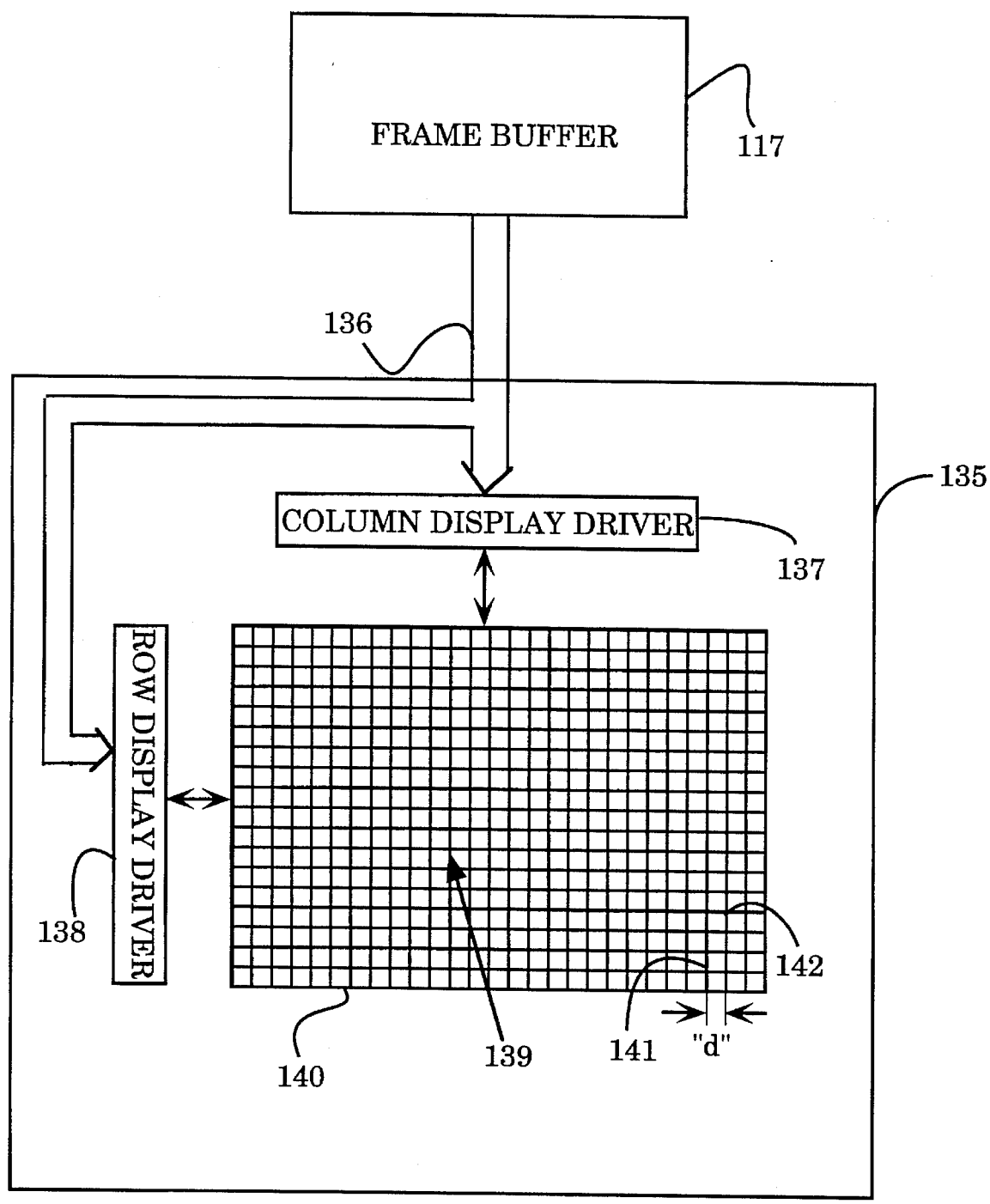
FIG. 3 is a perspective view of a system for testing drive circuitry of the display device without generating video test patterns onto the display screen of the display device.

Referring now to FIG. 3, the video signals may be input from the frame buffer 117 into a column and row display drivers 137 and 138 of the display device 135 via the unidirectional data display bus 136. The display drivers 137 and 138 format the video signals to ascertain which of a plurality of row and column drive lines 139 within its display screen 140 require activation and to consequently drive the pixels. In addition, there may be more complex pixel addressing configurations such as TFT LCDs. One type of video artifact, for example, may occur is referred to as a "smearing effect" where current from one of the display drive lines 141 leaks over to a neighboring display drive line 142 hereby activating the neighboring display drive line 142. This smearing effect may be detected only upon activation of drive line 138a and inactivation of drive line 142 which may not occur through static testing patterns unless in the unlikely manner that the static test pattern specifically activates drive line 141 and not drive line 142. This is only one example of the video artifacts detected by this system.

Figure 4A:
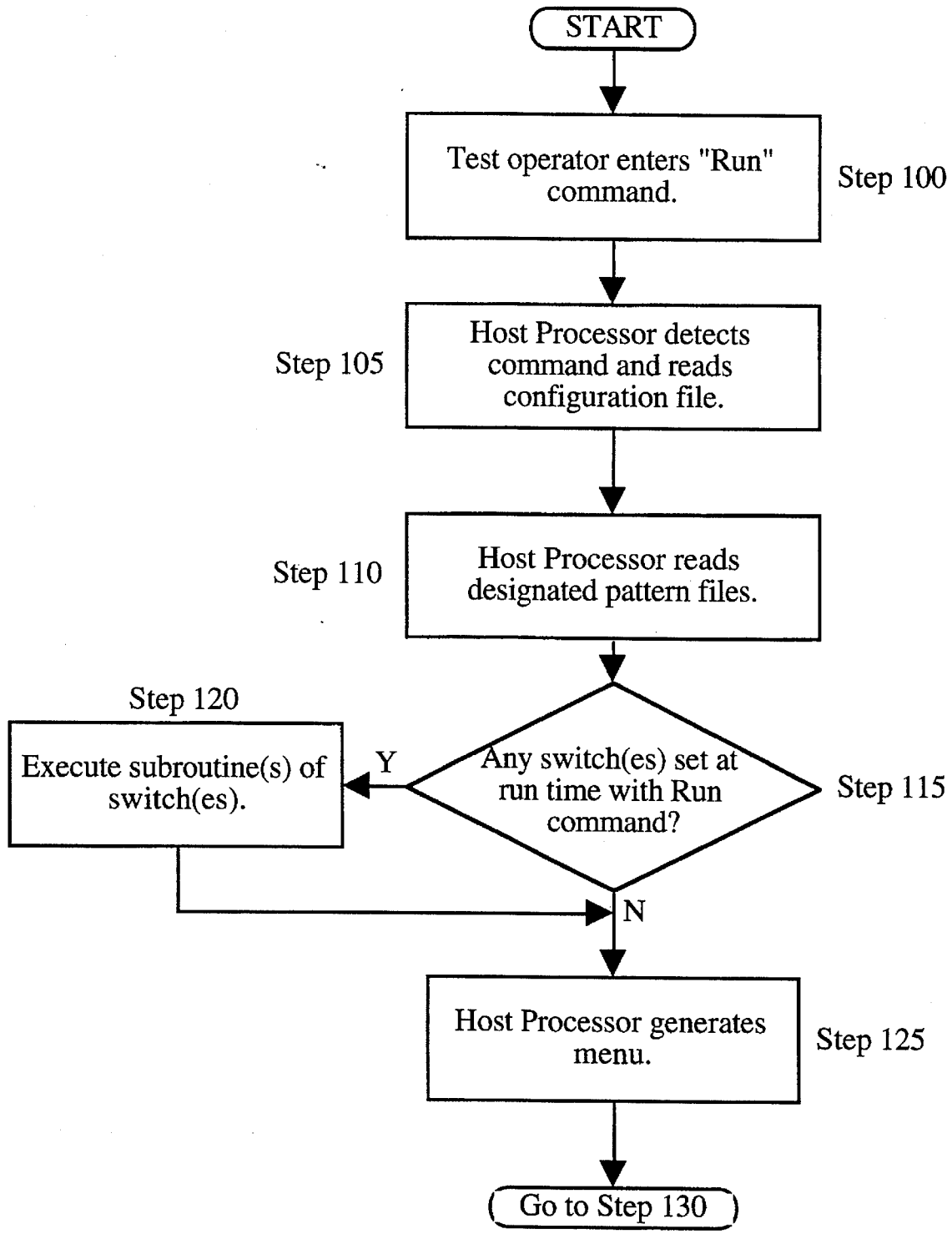
FIGS. 4A and 4B is a flowchart outlining the operational steps of the dynamically alterable test program used in a system relying on visual evaluation.
Figure 4B:
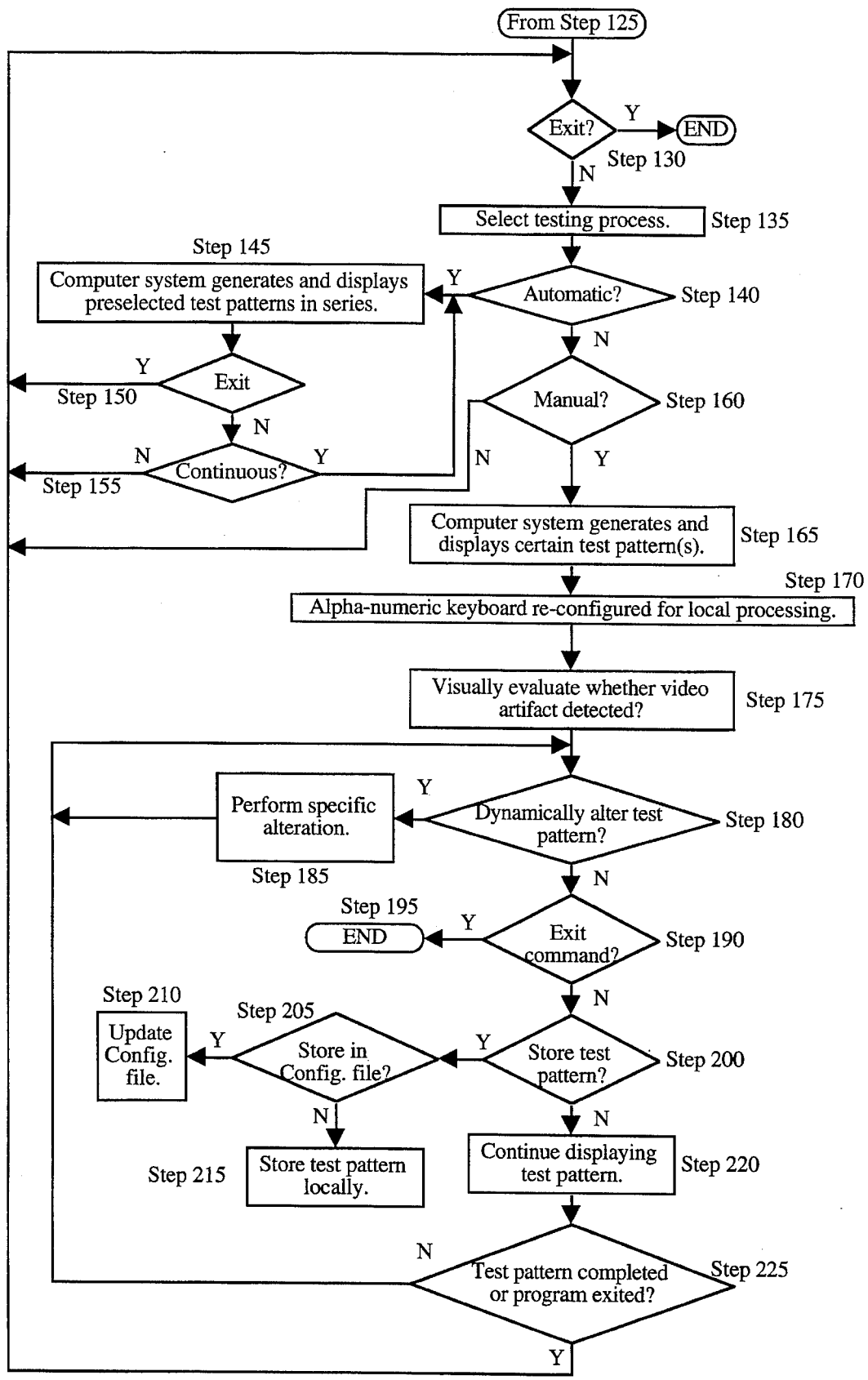

Referring to FIGS. 4A and 4B, an operational flowchart of the present invention undergoing a visual evaluation is illustrated. In step 100, a test operator transmits a command (hereinafter referred to as a "Run" command) into the computer system, normally through the alpha-numeric keyboard, to run a program generating at least one test pattern. During initialization of the program, a configuration file, usually stored in the mass storage device, is read by the host processor in order to obtain information concerning certain characteristics of the display device (Step 105). The "configuration" file is defined as a file in ASCII format for storing characteristics of a number of display devices in order to allow the host processor to generate test patterns tailored to the particular display device and to enable easy user editing. Such characteristics include a horizontal and vertical size (in pixels) of the display screen, total colors supported by the display device, gray scale levels and luminance levels concerning the pixels (including specification and tolerances). Additionally, in Step 110, the host processor reads designated test pattern files, stored in the mass storage device, in order to generate data signal associated with the test pattern. The test pattern files are default conditions which may be predetermined to be most useful in evaluating and analyzing a specific display device.

In addition to the Run command, a number of switches may be transmitted concurrently with the Run command in order to modify display characteristics, storage locations and other functions of the program (Step 115). These switches enable a particular function or modify a certain parameters (directory destinations, specific display characteristic, etc.). If the host processor detects that at least one switch is transmitted, the host processor typically executes a subroutine representative of the switch to perform the function or modification and continues its execution flow (Step 120). For example, it is contemplated that a switch may be used to alter display characteristics such as the horizontal and vertical widths of the display screen in pixels in order to configure the test program to the display device at run-time. Another example is that a switch may be used to read into or write from a selected file. A partial list of typical switches which are implemented is shown in Table A below.

TABLE A

| SWITCH | FUNCTION |
|---|---|
| Typical Implementation of Run-Time Switches | |
| -d/dev/device | Selects display device. |
| -X or -xdd | Selects the number of pixels in X-direction (width) of the display screen. |
| -Y or -ydd | Selects the number of pixels in Y-direction (height) of the display screen. |
| -Gdd | Specifies the number of shades of gray for the pattern. |
| -r | Suppresses the saving of the dynamically written files of a specific video pattern upon termination of the testing process. |
| -f/pathname/filename | Reads an initialization file of the selected name. |
| -fw/pathname/filename | Writes to a specific file upon termination of the testing process. |
| -z/pathname/filename | Reads a display specific configuration file. |
| -ldd | Selects a test pattern to be displayed in the automatic testing process. |
| -Ldd | Selects the last test pattern to be displayed in the automatic testing process. |

After initialization, the computer system enters into a "Global" mode in which the host processor generates a main menu of options available to the test operator (Step 125). One such option is to select the type of testing process to perform; namely, an automatic or manual testing process (Step 135. If the automatic testing process is selected and no exit command is initiated (Steps 130 and 140), the computer system generates a plurality of selected test patterns for displaying various objects on the display device to initially identify whether there exist any identifiable video artifacts (Step 145). This automatic testing process may be configured to operate in a continuous loop (Step 155). Upon completion of the selected test patterns, the computer system awaits another testing process selection. If an "Exit" command, normally depression of the "ESC" key on the alpha-numeric keyboard, is transmitted during the automatic testing process (Step 150), the program for generating the test pattern(s) returns to the Global mode (Step 130) enabling the program to be exited if desired.

Alternatively, the manual testing process typically is selected to enable the test operator to more thoroughly test the display device by selecting specific test patterns through the cursor control device or a representative key of the alphanumeric keyboard. If the manual testing process is selected (Step 160), the test operator is required to select a specific video test pattern to be generated by the computer system (step 165). Thereafter, the alpha-numeric keyboard is re-mapped for local processing of the specific video test pattern (Step 170) and the computer system enters into a "Local" mode where the specific video test pattern is evaluated for video artifacts (Step 175). In the Local mode, the video test pattern can be dynamically altered in size, placement or even exited through depression of a specific predetermined key of the alpha-numeric keyboard or any other means in transferring information approximately in real-time to perhaps define the boundary conditions of any uncovered video artifacts (Steps 180–195). For example, for an alpha-numeric keyboard having arrow keys, such keys may be configured to move the pattern up, down, left or right by one pixel. A typical configuration of these alpha-numeric keys for local control of the test pattern are illustrated in Tables B and C (see below) for illustrative purposes. The term "dd" is an integer value to be entered in combination with the switch; otherwise, a default value will be interpreted.

TABLE B

Typical Pattern Moving Keystrokes

| KEYSTROKE | FUNCTION |
| --- | --- |
| "l", "c", "u", "d", "↓", "↑", "←", "→" | Moves test pattern 1 pixel up, down, left or right. |
| "L", "R", "U", "D" | Moves test pattern 10 pixels up, down, left or right. |
| "1" (keypad) | Moves test pattern diagonally in the Southwest direction. |
| "3" (keypad) | Moves test pattern diagonally in the Southeast direction. |
| "7" (keypad) | Moves test pattern diagonally in the Northwest direction. |
| "9" (keypad) | Moves test pattern diagonally in the Northeast direction. |
| "0" (keypad) | Moves test pattern automatically in the direction last moved. |
| "Delete" | Stops test patterns automatic motion. |
| "+" (keypad) | Moves test pattern faster. |
| "−" (keypad) | Moves test pattern slower. |
| "*" (keypad) | Moves test pattern in random directions. |
| "g (number x, number y)" | Test pattern is displayed at (x, y) coordinates on the display screen. |
| "h" | Test pattern returns to home position. |
| "−" | Test pattern returns to the last position. |
| "+" | Test pattern is displayed at a next position. |

TABLE C

Typical Implementation Pattern Sizing Keystrokes

| KEYSTROKE | FUNCTION |
| --- | --- |
| "b" | Makes test pattern larger by 1 pixel. |
| "B" | Makes test pattern larger by 10 pixels. |
| "s" | Makes test pattern smaller by 1 pixel. |
| "S" | Makes test pattern smaller by 10 pixels. |
| "A" | Changes aspect ratio (width/height) for the test pattern. |
| "W" | Changes width and height of the test pattern. |
| "x" | Changes "x" axis size of the test pattern. |
| "y" | Changes "y" axis size of the test pattern. |

In the event that the defect is detected with the display screen or its associated display drive circuitry, the test pattern may be stored globally in the configuration file prompting the host processor to update the configuration file (Steps 200–210) or the test pattern may be stored locally within an external file or into local storage registers (Steps 215). The local storage registers are addressed by certain keys (e.g., function keys or number keys on the alphanumeric keyboard). In any event, the test pattern continues until its completion or exited prematurely (Steps 220–225) thereby prompting the testing operator to select another testing process.

In the event that neither the automatic nor manual testing processes are selected and an exit command is not detected, the evaluation process returns to Step 130 to detect whether either process is desired (Step 225).

Figure 4C:
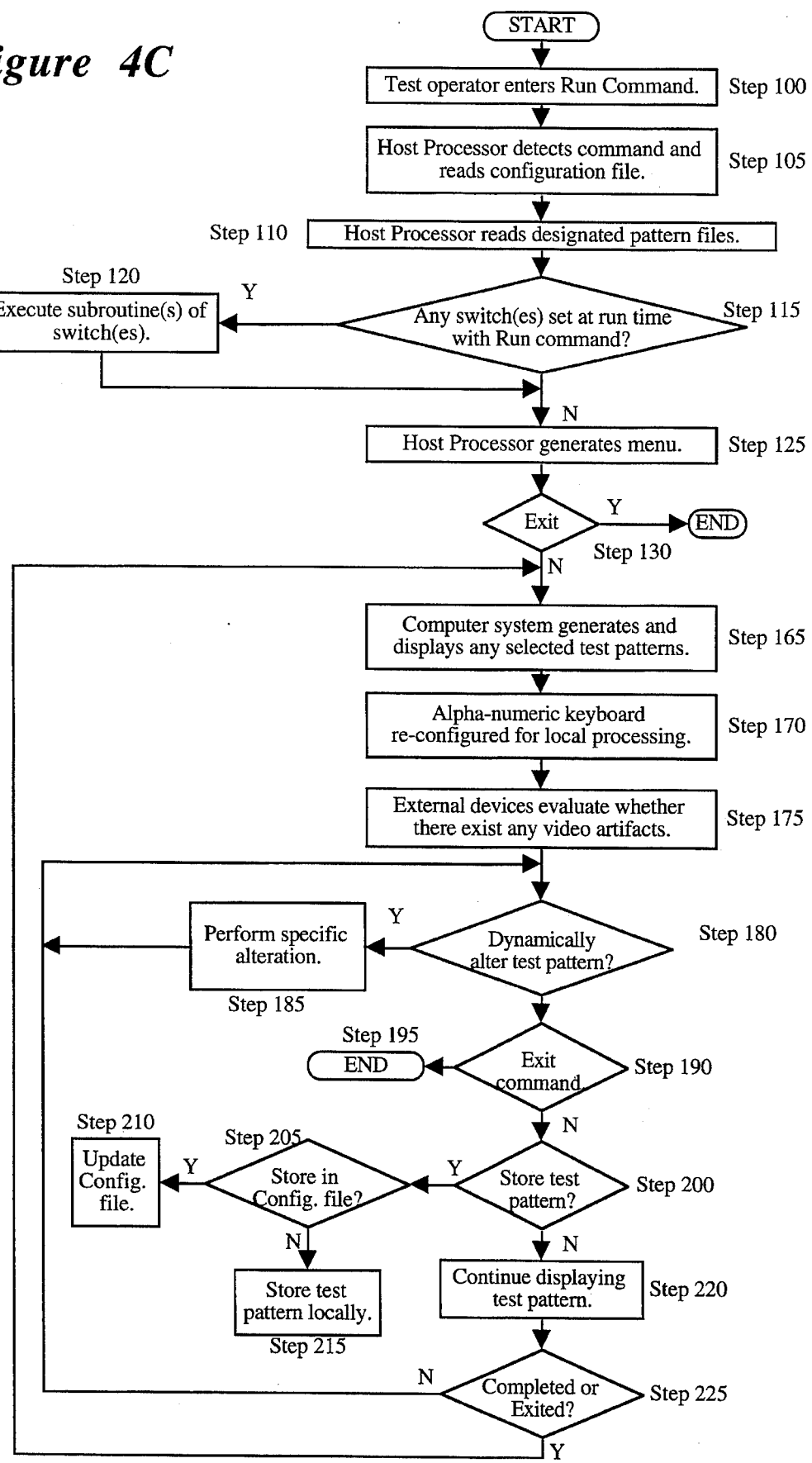
FIG. 4C is a flowchart outlining the operational steps of the dynamically alterable test program used in most optical and signal evaluation systems.

Referring to FIG. 4C, an operational flowchart of the present invention undergoing an optical or signal evaluation is illustrated. The operations undertaken in accordance with optical or signal evaluation incorporates those steps 100–130 and steps 165–225 of the visual evaluation procedures discussed above, but does not incorporate those steps involving the selection and operation of the automatic testing process (Steps 135–160). Such steps generally are not necessary because optical or signal evaluation must be performed with a stable video pattern or signal.

Figure 5A:
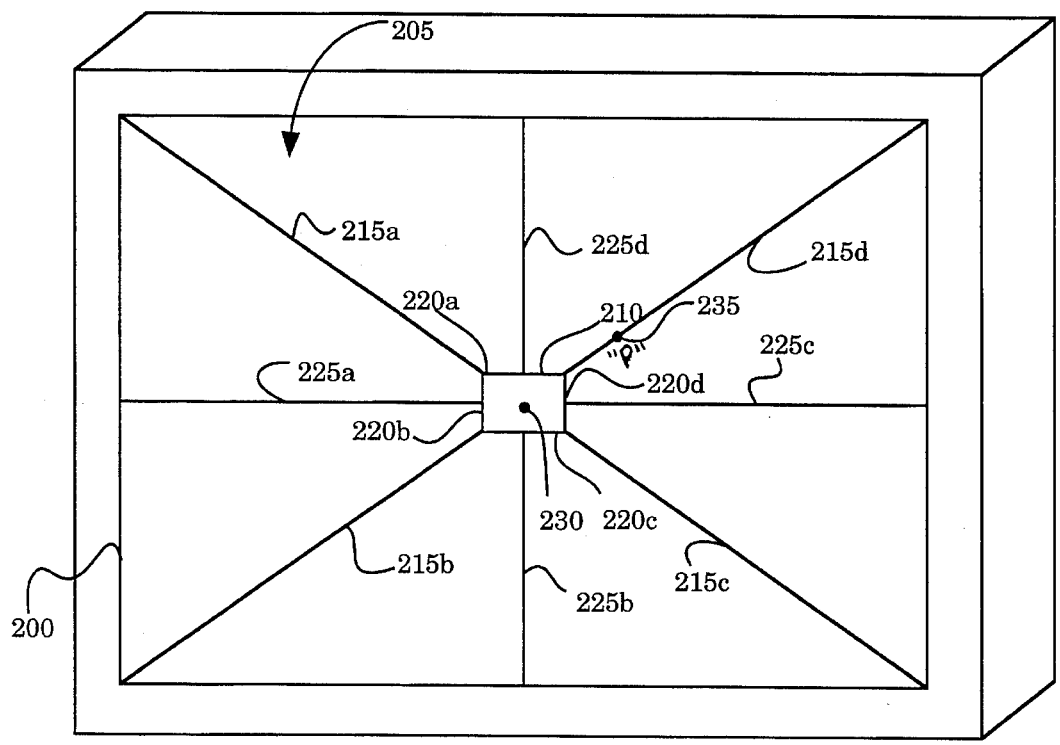
FIG. 5A is a planar view of a specific test pattern generated by the program to test for video artifacts with the display, particularly illumination defects.

Referring to FIG. 5A, as previously mentioned herein, for the purpose of explaining the present invention, a test pattern having dynamically alterable attributes is illustrated in operation on a display screen 200. The test pattern being a "locator" pattern 205 comprises a moveable and scalable square 210 having a first plurality of locator lines 215a–215d appearing to be anchored at vertices 220a–220d of the square 210 and a second plurality of locator lines 225a–225d equidistant between the vertices 220a–220d. Unlike the first plurality of locator lines 215a–215d, the second plurality of locator lines 225a–225d appear to be anchored only about the square 210 and are vertically and horizontally adjusted according to the adjustment of the square 210. The locator pattern 205 further comprises a target pixel 230 at the origin of the square 210 which designates an absolute location (i.e., horizontal and vertical coordinates in pixels) of any pixel or vertex of an object aligned with the target pixel 230.

Figure 5B:
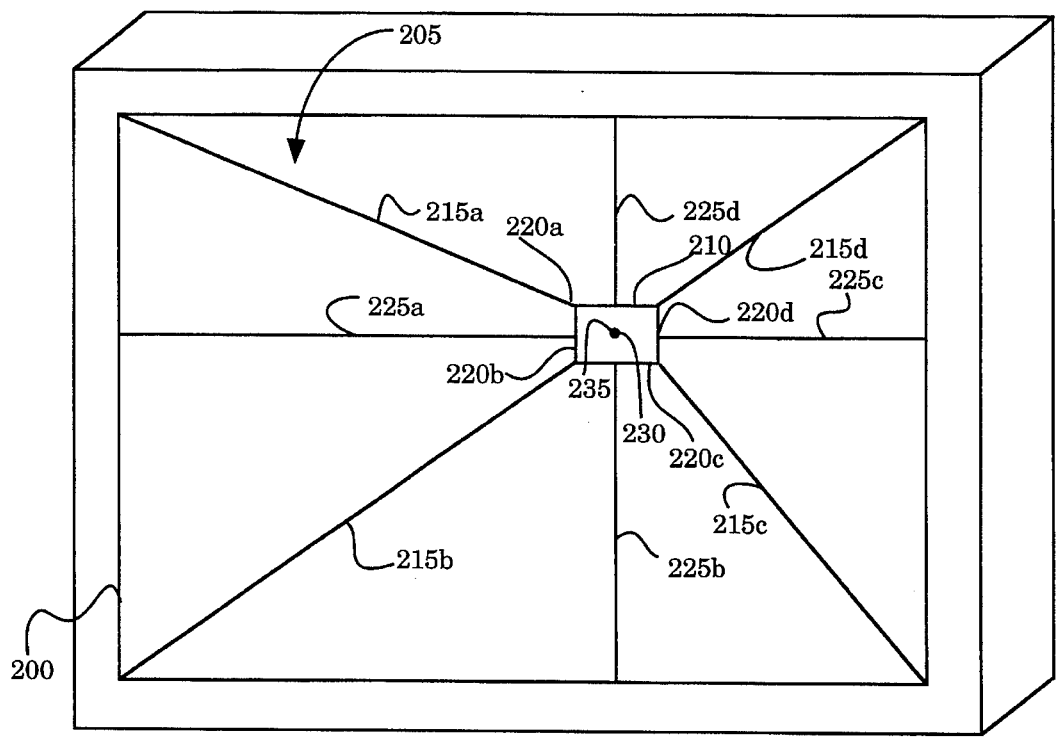
FIG. 5B is the specific test pattern dynamically altered to obtain the location of the defective screen pixel.

For example, suppose the display screen 200 is a VGA graphics display screen usually being 640×480 pixels in length and width, has an improperly illuminated pixel labeled "P" 235 at (400, 280). Conventionally, one would have to estimate the location without using absolute pixel coordinates. In the locator test pattern, after performing the above operations so that the system is aware that the display is a VGA display, the target pixel 230 is aligned with the improperly illuminated pixel 235 to illustrate that there exists an illumination defect at (400, 280) as shown in FIG. 5B. Thereafter, the absolute location of the improperly illuminated pixel and the chosen square size can be stored globally in the configuration file or locally by writing to an existing file or storing the state of the pattern into storage elements.

No particular programming language has been indicated for carrying out the various procedures described above. This is due in part to the fact that different computer languages may be more suitable for different computer systems. It is considered that the procedures described above and illustrated in flowcharts are sufficient to permit one of ordinary skill in the art of electronic display devices to practice the present invention. It is clear that the present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for evaluating and detecting video artifacts of a display device and its associated display drive circuitry employed within a computer system including a processor, the method comprising the steps of:

reading a configuration file by the processor in order to ascertain characteristics of the display device;

executing a test program by the processor in order to generate a plurality of data signals;

converting said plurality of data signals into corresponding video signals collectively forming a specific test pattern and transferring said plurality of video signals through the display drive circuitry and into the display device; and selecting a testing process, wherein one of said testing process is a manual testing process including the steps of choosing said specific test pattern for evaluating the display device, and evaluating said specific test pattern to determine if any video artifacts are associated with the display device and the display drive circuitry.

2. A method for evaluating and detecting video artifacts of a display device and its associated display drive circuitry employed within a computer system including a processor a video storage and conversion element and an input device, the method comprising the steps of:

executing a test program by the processor in order to generate a plurality of data signals;

converting said plurality of data signals by the video storage and conversion element into corresponding video signals collectively forming a specific test pattern and transferring said plurality of video signals through the display drive circuitry and into the display device; and selecting a testing process, said test processor includes a manual testing process including the steps of choosing said specific test pattern for evaluating the display device, evaluating said specific test pattern to determine if any video artifacts are associated with the display device and the display drive circuitry, and dynamically altering said specific test pattern by the input device in order to ascertain boundary conditions of said video artifact.

3. The method according to claim 2, wherein subsequent to said evaluating step, the method further comprises the step of storing said specific test pattern existing in a given state thereby allowing said specific test pattern to be retrieved.

4. The method according to claim 2, wherein subsequent to the evaluating step, the method further comprises the step of locally writing said specific test pattern existing in a given state into local storage registers thereby allowing said specific test pattern to be retrieved.

5. The method according to claim 1, wherein prior to the executing step, the method further comprises the step of modifying said characteristics of the display device stored in said configuration file in order to alter said specific test pattern.

6. A method for evaluating and detecting video artifacts of a display device and its associated display drive circuitry employed within a computer system including a processor, the method comprising the steps of:

reading a configuration file by the processor in order to ascertain characteristics of the display device;

executing a test program by the processor in order to generate a plurality of data signals;

converting said plurality of data signals into corresponding video signals collectively forming a specific test pattern and transferring said plurality of video signals through the display drive circuitry and into the display device; and selecting an automatic testing process including the steps of:

executing said test patterns in order to produce at least two of said plurality of dynamically alterable test patterns, said at least two of said plurality of dynamically alterable test patterns being transmitted into the display device through the display circuitry, and determining whether an exit command has been detected, wherein if said exit command has been detected, exiting from said automatic testing process upon completion of displaying said at least two of said plurality of dynamically alterable test patterns by said display device, and if said exit command has not been detected, continuing to produce and display said at least two of said plurality of dynamically alterable test patterns.

7. A method for evaluating and detecting video artifacts of a display device and its associated display drive circuitry through a measuring device, the display device and its display drive circuitry being employed within a computer system, the method comprising the steps of:

reading a configuration file in order to obtain characteristics of the display device;

executing a test program in order to generate at least a plurality of data signals;

converting said plurality of data signals into corresponding video signals collectively forming a specific test pattern and transferring said plurality of video signals through the display drive circuitry and into the display device;

executing said test program in order to generate at least a plurality of video signals collectively forming said specific test pattern and to transfer said plurality of video signals through the display drive circuitry and into the display device; and evaluating characteristics of the display device and display drive circuitry based on measurements by the measuring device.

8. The method according to claim 7, wherein prior to said evaluating step, said method further comprises the step of re-mapping an input device so that the input device may provide said information for dynamically altering said specific test pattern.

9. The method according to claim 8, wherein the evaluating step comprises the step of measuring pixel illuminance.

10. The method according to claim 8, wherein the method further comprises the step of dynamically altering said specific test pattern in order to ascertain boundary conditions of said video artifact.

11. The method according to claim 8, wherein the method further comprises the step of storing said specific test pattern existing in a given state thereby allowing said specific test pattern to be produced thereafter.

12. The method according to claim 8, wherein the method further comprises the step of locally writing said specific test pattern existing in a given state into local storage registers thereby allowing said specific test pattern to be produced thereafter.

13. The method according to claim 8, wherein the evaluating step comprises the step of measuring characteristics of said plurality of video signals.

14. The method according to claim 13, wherein the method further comprises the step of dynamically altering said specific test pattern in order to ascertain boundary conditions of said video artifact.

15. The method according to claim 13, wherein the method further comprises the step of storing said specific test pattern existing in a given state thereby allowing said specific test pattern to be retrieved.

16. The method according to claim 13, wherein the method further comprises the step of locally writing said specific test pattern existing in a given state into local storage registers thereby allowing said specific test pattern to be retrieved.

17. A system for evaluating and detecting video artifacts of a display device and its associated display drive circuitry, said system comprising:

a bus;

a memory subsystem coupled to said bus, said memory subsystem contains at least a test program and a configuration file;

a processor subsystem coupled to said bus, said processor subsystem executes said test program contains in said memory subsystem in order to generate a plurality of data signals and accesses said configuration file to obtain characteristics of the display device;

a video subsystem coupled to said bus and the display device, said video subsystem converts said plurality of data signals generated by said processing subsystem into corresponding video signals collectively forming a video test pattern to drive the display device; and an input/output subsystem coupled to said bus, said input/output subsystem enables said video test pattern to be dynamically altered based on information transferred from said input/output subsystem into said processor subsystem.

18. A method for evaluating and detecting video artifacts of a display device and its associated display drive circuitry, the method comprising the steps of:

executing a test program in order to generate at least a plurality of data signals;

converting said plurality of data signals into corresponding video signals collectively forming a specific test pattern and transferring said plurality of video signals through the display drive circuitry and into the display device; and evaluating said specific test pattern to determine if any video artifacts are associated with the display device and the display drive circuitry, wherein if a video artifact exists, dynamically altering said specific test program in order to ascertain boundary conditions of said video artifact.

19. The method according to claim 18, wherein prior to said executing step, said method further comprises the step of reading a configuration file in order to obtain characteristics of the display device.

20. A method for evaluating and detecting video artifacts of a display device and its associated display drive circuitry through a measuring device, the method comprising the steps of:

executing a test program in order to generate at least a plurality of data signals;

converting said plurality of data signals into corresponding video signals collectively forming a specific test pattern and transferring said plurality of video signals through the display drive circuitry and into the display device;

executing said test program in order to generate at least a plurality of video signals collectively forming said specific test pattern and to transfer said plurality of video signals through the display drive circuitry and into the display device;

evaluating characteristics of the display device and display drive circuitry based on measurements by the measuring device; and dynamically altering said specific test pattern in order to ascertain boundary conditions of said video artifact.

* * * * *